United States Patent
Remboski et al.

(10) Patent No.: US 12,132,367 B2
(45) Date of Patent: Oct. 29, 2024

(54) LUBRICANT SUPPORTED ELECTRIC MOTOR WITH ELECTRICALCONDUCTORS FUNCTIONING AS AN OUTER RACEWAY

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: Neapco Intellectual Property Holdings, LLC

( * ) Notice: Subject to any disclaimer, the term of this patent is extended or adjusted under 35 U.S.C. 154(b) by 0 days.

(21) Appl. No.: 18/295,282

(22) Filed: Apr. 4, 2023

(65) Prior Publication Data
US 2023/0238844 A1    Jul. 27, 2023

Related U.S. Application Data

(63) Continuation of application No. 17/341,673, filed on Jun. 8, 2021, now Pat. No. 11,652,379.
(Continued)

(51) Int. Cl.
*H02K 1/16* (2006.01)
*H02K 3/16* (2006.01)
(Continued)

(52) U.S. Cl.
CPC ............... *H02K 3/16* (2013.01); *H02K 1/16* (2013.01); *H02K 3/28* (2013.01); *H02K 5/128* (2013.01);
(Continued)

(58) Field of Classification Search
CPC .. H02K 3/16; H02K 1/16; H02K 3/28; H02K 5/128; H02K 2201/03; H02K 2203/09; H02K 5/167; H02K 9/19
See application file for complete search history.

(56) References Cited

U.S. PATENT DOCUMENTS

| | | | | |
|---|---|---|---|---|
| 2009/0256442 A1* | 10/2009 | Stiesdal | ............... | F03D 9/25 310/90 |
| 2012/0274172 A1* | 11/2012 | Koga | ............... | H02K 15/066 310/208 |

(Continued)

FOREIGN PATENT DOCUMENTS

| | | |
|---|---|---|
| DE | 102015207778 A1 * | 11/2016 |
| JP | 58049057 A * | 3/1983 ............... H02K 3/32 |

OTHER PUBLICATIONS

JPS5849057A English translation (Year: 2023).*
DE102015207778A1 English translation (Year: 2023).*

*Primary Examiner* — Terrance L Kenerly
*Assistant Examiner* — Viswanathan Subramanian
(74) *Attorney, Agent, or Firm* — Dickinson Wright PLLC

(57) ABSTRACT

An electric motor comprises a stator presenting a first surface. A rotor is rotatable relative to the stator. The rotor presents a rotor raceway disposed in spaced relationship with the first surface of the stator. The first surface of the stator defines a plurality of slots in spaced relationship with one another to define a plurality of spaced teeth between the slots. At least one electrical conductor is disposed in each of the slots and configured to selectively create a moving magnetic field for acting upon the rotor for providing rotational movement of the rotor. A portion of the at least one electrical conductor extends substantially into radial alignment with, or past the first surface of the stator to at least partially define a stator raceway of the stator for engaging (Continued)

the rotor raceway of the rotor during relative radial movement between the rotor and the stator.

7 Claims, 4 Drawing Sheets

Related U.S. Application Data

(60) Provisional application No. 63/036,167, filed on Jun. 8, 2020.

(51) Int. Cl.
*H02K 3/28* (2006.01)
*H02K 5/128* (2006.01)
*H02K 5/167* (2006.01)

(52) U.S. Cl.
CPC ......... *H02K 5/167* (2013.01); *H02K 2201/03* (2013.01); *H02K 2203/09* (2013.01)

(56) References Cited

U.S. PATENT DOCUMENTS

| | | | |
|---|---|---|---|
| 2013/0033144 A1* | 2/2013 | Alfermann | H02K 15/0012 310/211 |
| 2015/0001984 A1* | 1/2015 | Bradfield | H02K 3/493 310/216.069 |
| 2015/0188371 A1* | 7/2015 | Kato | H02K 15/045 310/208 |
| 2020/0044511 A1* | 2/2020 | Remboski | H02K 7/08 |

* cited by examiner

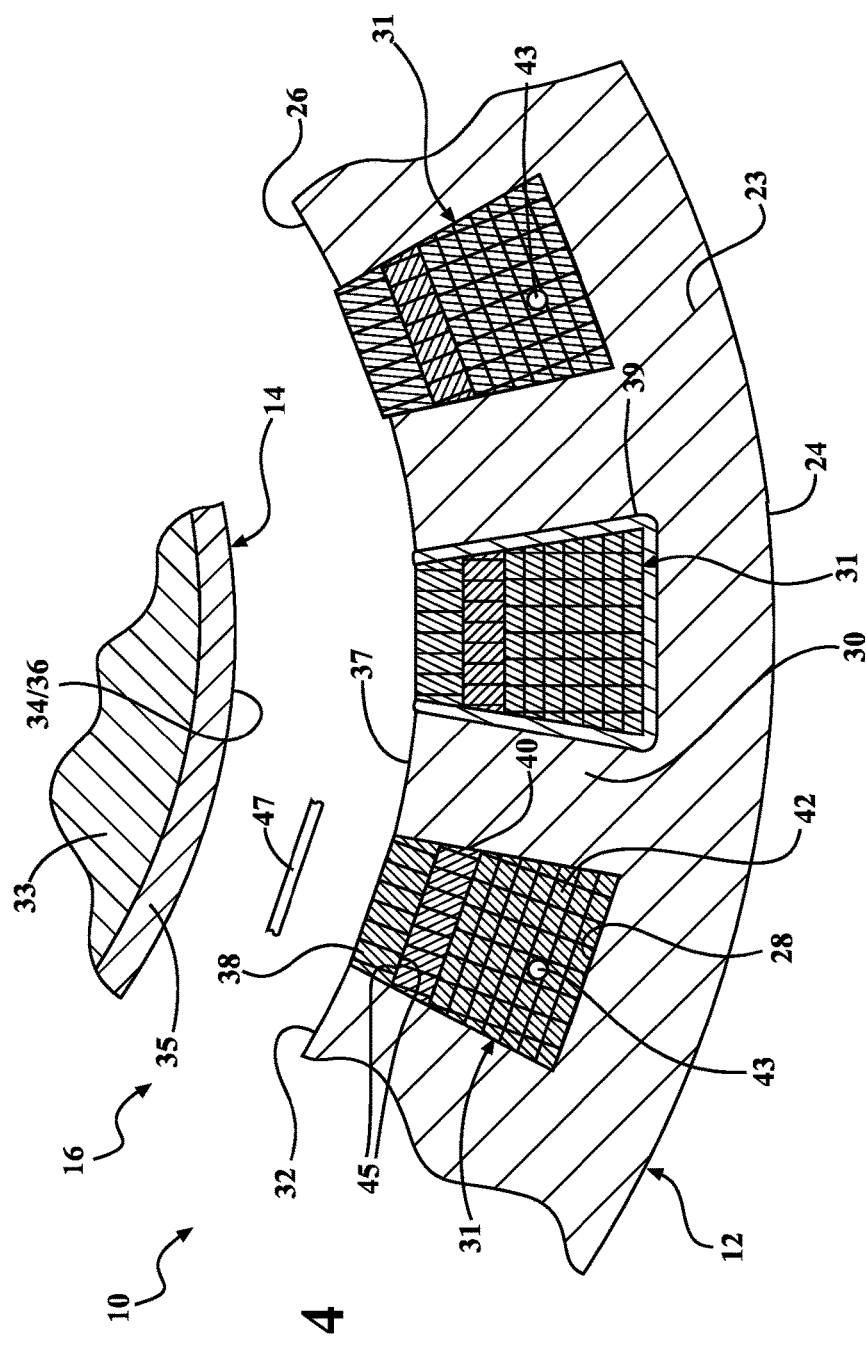
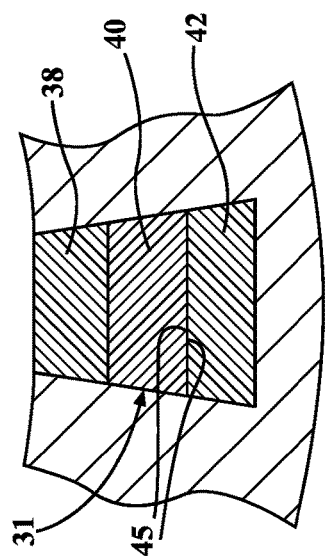
FIG. 4
FIG. 4A

LUBRICANT SUPPORTED ELECTRIC MOTOR WITH ELECTRICAL CONDUCTORS FUNCTIONING AS AN OUTER RACEWAY

CROSS-REFERENCES TO RELATED APPLICATIONS

This application is a continuation of U.S. patent application Ser. No. 17/341,673, filed on Jun. 8, 2021, which claims priority to U.S. Provisional Patent Application Ser. No. 63/036,167, filed Jun. 8, 2020, the entire disclosure of which is hereby incorporated by reference in its entirety.

TECHNICAL FIELD

The present disclosure relates generally to a lubricant supported electric motor. More specifically, the present disclosure relates to a lubricant supported electric motor with a raceway of a stator defined by electrical conductors.

BACKGROUND

This section provides a general summary of background information and the comments and examples provided in this section are not necessarily prior art to the present disclosure.

Various drivelines in automotive, truck, and certain off-highway applications take power from a central prime mover such as an internal combustion engine ("ICE") and distribute the power to wheels using mechanical devices such as transmissions, transaxles, propeller shafts, and live axles. However, attention is being increasingly directed towards alternative arrangements of prime movers that provide improved environmental performance, eliminate mechanical driveline components, and result in lighter-weight vehicles with more space for passengers and payload.

"On wheel", "in-wheel" or "near-wheel" motor configurations are one alternative arrangement to traditional ICE prime movers that distribute the prime mover function to each or some of the plurality of wheels via one or more motors disposed on, within, or proximate to the plurality of wheels. For example, in one instance, a traction motor, using a central shaft through a rotor and rolling element bearings to support the rotor, can be utilized as the "on wheel", "in wheel" or "near wheel" motor configuration. In another instance, a lubricant supported electric motor, such as described in U.S. application Ser. No. 16/144,002, can be utilized as the "on wheel", "in wheel" or "near wheel" motor configuration. While each of these motor configurations result in a smaller size and lighter weight arrangement as compared to the prime movers based on ICEs, there remains room for further improvements.

For example, the utilization of traction motors as the "on wheel", "in wheel" or "near wheel" configuration still results in motors that are relatively heavy and often not sufficiently robust for shock loading in order to be optimized for wheel-end applications. In other words, present traction motors are large, heavy structures supported by rolling element bearings, which are relatively heavy for practical wheel end applications. Lubricant supported electric motors as the "on wheel", "in wheel" or "near wheel" motor in an automotive or land vehicle application are a lightweight alternative to traction motors. Such lubricant supported motors include a lubricant disposed in a gap between a rotor and stator for supporting the rotor within the stator and providing continuous contact between these components.

The lubricant may therefore act as a bearing (e.g., suspension) between the rotor and stator, minimizing or preventing contact therebetween. It is known to locate a bearing sleeve of high resistivity material such as Hastelloy or Delrin between the rotor and stator to accommodate rotational contact between the rotor and stator. An issue with such bearing sleeves is that they can cause eddy current losses from the stator, thus leading to decreased performance. It is also known to locate a non-conductive polymer bearing sleeve between the rotor and stator, however such bearing sleeves have relatively poor mechanical properties. Furthermore, both of these options require additional fabrication and assembly steps. Accordingly, although known lubricant supported electric motors provide a lightweight alternative to traction motors, there remains a need for further improvements.

SUMMARY OF THE INVENTION

An electric motor comprises a stator presenting a first surface. A rotor extends along an axis and is rotatable relative to the stator. The rotor presents a rotor raceway disposed in spaced relationship with the first surface of the stator to define a gap therebetween for containing a lubricant. The first surface of the stator defines a plurality of slots in spaced relationship with one another to define a plurality of spaced teeth between the slots. At least one electrical conductor is disposed in each of the slots and is configured to selectively create a moving magnetic field for acting upon the rotor for providing rotational movement of the rotor in response to a current being applied to the at least one electrical conductor. A portion of the at least one electrical conductor in each of the slots extends substantially into radial alignment with, or past the first surface of the stator to at least partially define a stator raceway of the stator for engaging the rotor raceway of the rotor during relative radial movement between the rotor and the stator to function as a bearing while also creating the moving magnetic field.

The use of one or more electrical conductors such as windings (and optionally also the stator core) to define the outer raceway allows the electrical conductors to not only provide current conduction to drive the rotor, but also to mechanically support the stator. This eliminates the need for a separate stator bearing sleeve to mechanically support the stator, thus providing a more simple and compact assembly and simplifying manufacturing and assembly of the electric motor.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 4 is a partial, front cross-sectional view of a stator and a rotor of the lubricant supported electric motor illustrating electrical conductors in a slot of the stator which act as an inner raceway; and FIG. 4A is a partial, front cross-sectional view of a stator of the lubricant supported electric motor illustrating an alternate arrangement of electrical conductors in a slot.

DESCRIPTION OF THE EXEMPLARY EMBODIMENTS

Figure 1:
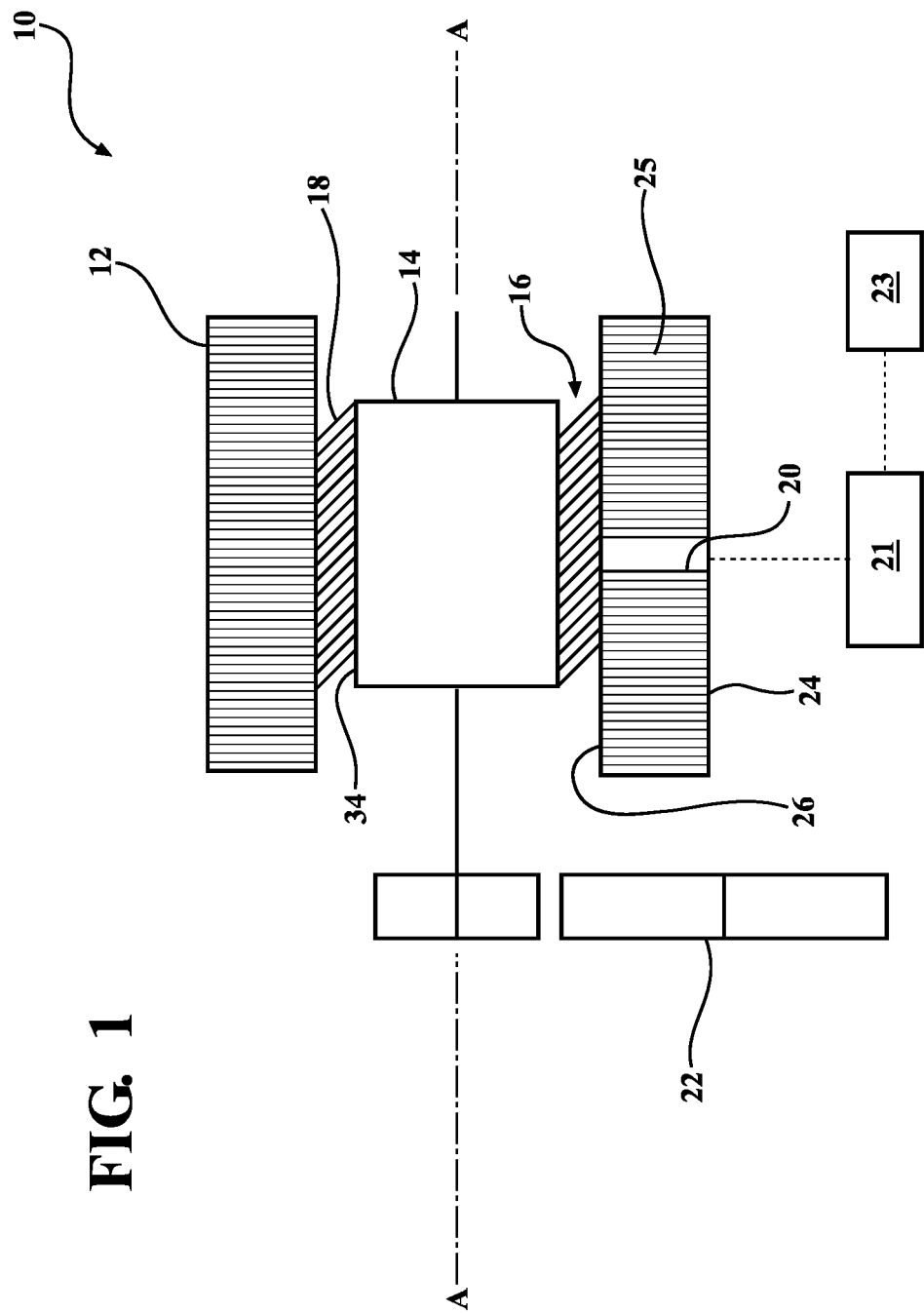
FIG. 1 is a schematic view of a lubricant supported electric motor.

Example embodiments of a lubricant supported electric motor with at least one electrical conductor that functions as an outer raceway of a stator in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure. The following example embodiment describes a radial flux electric motor 10 with a rotor 14 rotatably located within a stator 12. The teachings herein may also be applied to a reverse radial flux motor with a rotor rotatably positioned about a stator, axial flux motors and axial/radial flux motors without departing from the scope of the subject disclosure FIGS. 1-4A illustrate a lubricant supported electric motor 10 in accordance with an aspect of the disclosure. As best illustrated in FIG. 1, the lubricant supported electric motor 10 includes the stator 12 and the rotor 14 extending along an axis A and rotatably disposed within the stator 12 to define a gap 16 therebetween. A lubricant 18 is disposed in the gap 16 for supporting the rotor 14 within the stator 12, and providing continuous contact between these components. The lubricant 18 may therefore act as a buffer (e.g., suspension) between the rotor 14 and stator 12 to minimize or prevent contact therebetween. In other words, the lubricant 18 minimizes direct contact between the stator 12 and rotor 14 and provides an electric lubricant supported motor 10 which is robust to shock and vibration loading due to the presence of the lubricant 18. Additionally or alternatively, a substantially incompressible lubricant 18 may be used in order to minimize the gap between the stator 12 and rotor 14.

As further illustrated FIG. 1, the stator 12 defines one or more passageways 20 in fluid communication with the gap 16 for introducing the lubricant 18. The passageway 20 may also be provided on any other components of the lubricant supported electric motor 10 without departing from the subject disclosure. According to an aspect, the lubricant 18 may be cycled or pumped through the passageway 20 and into the gap 16 in various ways. For example, a high pressure source 21 (e.g., a pump, schematically shown) of the lubricant 18 may be fluidly coupled to a low pressure source 23 (e.g., a sump, schematically shown) of the lubricant 18, and the lubricant may move from the high pressure source to the lower pressure source 23, through the passageway 20 and into the gap 16. Furthermore, rotation of the rotor 14 relative to the stator 12 may operate as a self-pump to drive lubricant 18 through the passageway 20 and into the gap 16.

As further illustrated in FIG. 1, the rotor 14 is coupled with a drive assembly 22 for coupling the lubricant supported electric motor 10 to one of the plurality of wheels of the vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving the rotor 14 and ultimately driving the wheel coupled to the lubricant supported electric motor 10 via the drive assembly 22. The drive assemblies 20 may provide one or more reduction ratios between the lubricant supported electric motor 10 and the wheel in response to movement of the rotor 14.

With reference to FIGS. 1, 2, 4 and 4A, the stator 12 includes a core 23 that is comprised of a plurality of axially compressed laminations 25 of a steel material (schematically shown in FIG. 1). The core 23 presents a machined radially inside (first) surface 26 and a radially outside (second) surface 24. The radially inside surface 26 defines a plurality of radially-outwardly extending slots 28 that are circumferentially spaced from one another and define a plurality of teeth 30 circumferentially therebetween. One or more electrical conductors 31 are received in each of the slots 28 and are collectively configured to selectively create a moving magnetic field which acts upon the rotor 14 for providing rotation of the rotor 14 in response to a current being applied thereto. As shown in the example embodiment, the electrical conductors 31 may be comprised of one or more axially extending conductive bars 31. Alternatively, the electrical conductors 31 could be comprised of windings that are wrapped about or otherwise coupled to the teeth 30. At least a portion of one or more of the electrical conductors 31 in each of the slots 28 extends radially inwardly from the slot 28 substantially into radially alignment with, or past the inside surface 26 of the stator 12 such that the electrical conductor 31 at least partially defines an outer stator raceway 32. The electrical conductors 31 may therefore define the outer stator raceway 32 alone, or in combination with the inside surface 26 of the stator 12. Under the arrangement in which the outer stator raceway 32 is defined by both the electrical conductors 31 and the inside surface 26 of the stator 12, the outer raceway 32 may be defined by circumferentially alternating segments of the electrical conductors 31 and the inside surface 26 of the stator 12. The use of the electrical conductors 31 to define the outer raceway 32 allows the electrical conductors 31 to not only provide current conduction to drive the rotor 14, but also to mechanically support the stator 12. This eliminates the need for a separate stator bearing sleeve to mechanically support the stator 12, thus providing a simpler and compact assembly and simplifying manufacturing and assembly of the electric motor 10. The rightmost slot 28 in FIG. 4 illustrates an arrangement in which the electrical conductors 31 extend radially inwardly of the stator 12, while the other slots 28 of FIG. 4 illustrate arrangements in which the electrical conductors 31 are in substantial alignment with the stator 12. Any combination of the electrical conductors 31/slots 28 shown in FIG. 4A may be used.

Figure 3:
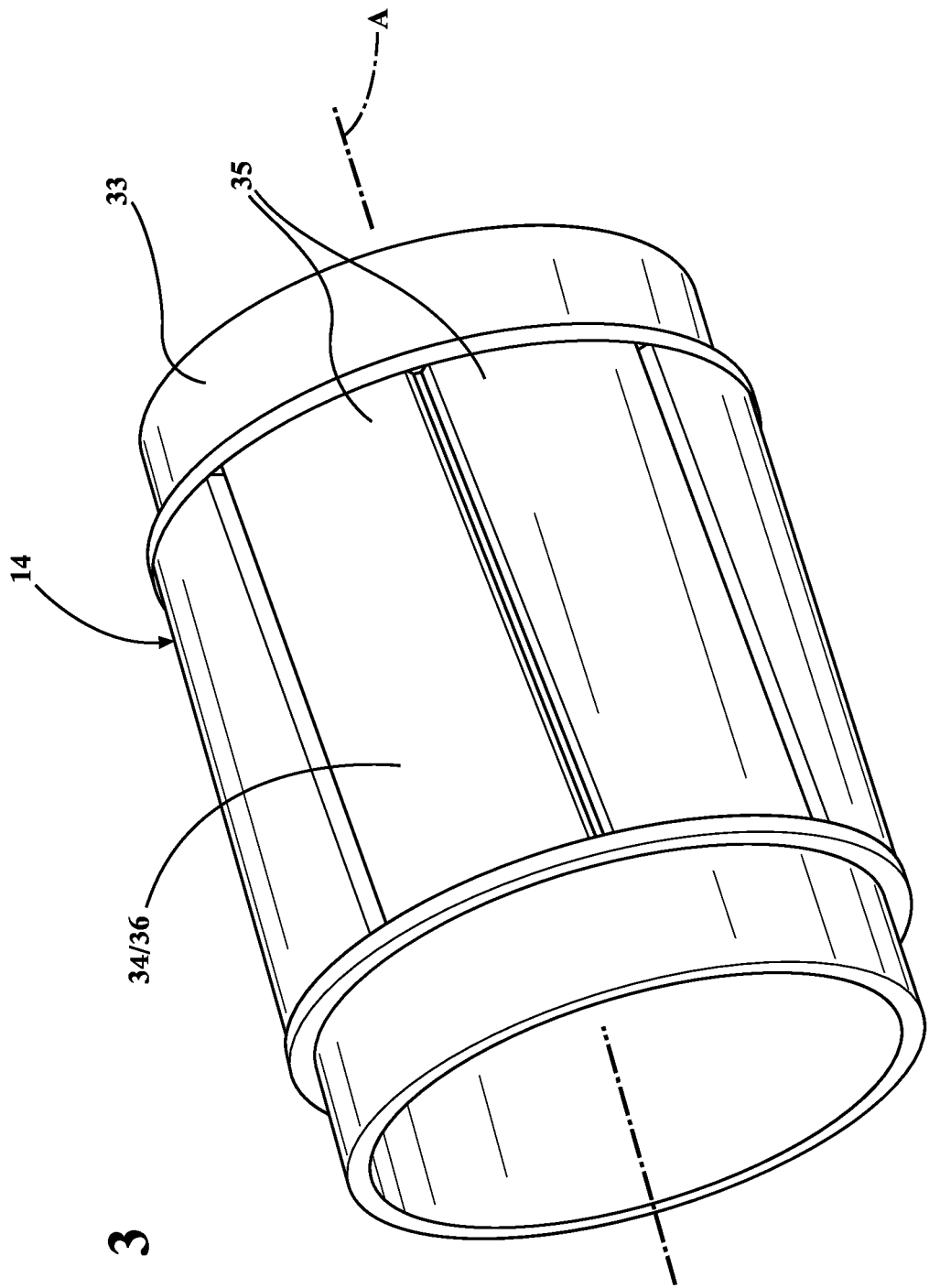
FIG. 3 is a perspective view of a rotor of the lubricant supported electric motor.

With reference to FIGS. 1, 3 and 4, the rotor 14 is comprised of a rotor core 33 and a plurality of magnets 35 positioned about an outer surface of the rotor core 33. As shown in FIG. 3, the magnets 35 may each generally extend axially, and may be arranged in circumferentially spaced relationship with one another. A radially outer perimeter 34 of the rotor 14 (along the magnets 35) defines an inner rotor raceway 36. The outer and inner raceways 32, 36 are configured to act as a bearing by accommodating relative rotational movement between the stator 12 and rotor 14 in the event that the inner and outer raceways 32, 36 contact one another in response to radial movement between the rotor 10 and stator 12. As will be discussed in further detail below, because the electrical conductors 31 partially define the outer raceway 32, they are configured not only to conduct a current to provide rotation of the rotate 14, but also to mechanically support the stator 12.

As best shown in FIGS. 4 and 4A, the electrical conductors 31 may be comprised of two or more layers 38, 40, 42 of electrical conductors 31 that are stacked on top of one another in the radial direction. According to the example embodiment, the stacked layers 38, 40, 42 of electrical conductors 31 include a top layer 38, a middle layer 40 and a bottom layer 42, however, more or fewer layers 38, 40, 42 could be utilized without departing from the scope of the subject disclosure. The stacked layers 38, 40, 42 of electrical conductors 31 are assembled in such a manner as to provide a tight fit in the slot 28 using any of a number of techniques such as an interference press fit, thermal shrink fit, displacement/deformation rolling processes and others. As illustrated in FIG. 4, each layer 38, 40, 42 of electrical conductors 31 may be comprised of a plurality of conductive bars, however, as shown in FIG. 4A, each layer 38, 40, 42 could alternatively be comprised of only a single conductive bar.

The top layer 38 which defines the portion of the outer raceway 32 is comprised of a lower conductivity and harder material (e.g., copper iron (CuFePCoSn) or copper zinc (CuZn5)) than the layers 40, 42 below it in order to provide minimal electrical resistance of the overall electrical conductors 31 while also providing a harder surface for the outer raceway 32. On the other hand, the middle and bottom layers 40, 42 are comprised of a material that has higher conductivity and is softer (e.g., oxygen carrying copper (Cu-ETP) or oxygen-free high conductivity copper (Cu-OF)) than that of the top layer 38 in order to provide an adequate magnetic field. Copper alloys with very high conductivity are typically mechanically softer materials, and less than optimal for bearing surfaces. On the other hand, harder copper alloys that are more suitable for bearing surfaces typically have a lower conductivity which would work against motor efficiency if used in a layer beneath the top layer 38. By using high-conductivity/soft materials and lower-conductivity/hard materials in the right radial locations of the electrical conductors 31, a hard bearing surface and sufficient conductivity are provided. As illustrated in FIGS. 4 and 4A, the structure of the stacked layers 38, 40, 42 of electrical conductors 31 achieves mechanical stiffness by having the layers 38, 40, 42 of electrical conductors 31 arranged with flat surfaces 45 stacked upon each other with a minimal insulating layer therebetween. More particularly, each of the layers of electrical conductors 38, 40, 42 includes at least one substantially planar bottom and/or top surface 45, with the substantially planar surfaces 45 overlying and engaging one another in the slot 28.

As further illustrated in FIG. 4, according to an embodiment, the outer raceway 32 may present a substantially smooth surface in the circumferential direction. This may be provided by the electrical conductors 31 alone or in combination with the teeth 30. As part of this arrangement, a polymer coating 47 may extend over the electrical conductors 31 in each of the slots 28 and the first surface of the stator 12 to define the substantially smooth surface. The smooth surface may be provided about part of, or an entire circumference of the outer raceway 32.

As further illustrated in FIG. 4, one or more of the electrical conductors 31 may define a cooling passage 43 which may receive coolant from the high or low pressure sources 21, 24 for cooling the electrical conductors 31. Any number of cooling passages 43 may be provided on any number of the electrical conductors 31.

The stator laminations 25 are assembled and held with sufficient compressive forces and sealing to avoid lubricant oil infiltration into the laminations 25. Techniques/features for providing such compressive forces and sealing include:

- Overall structures to compress the laminations 25 of the core 23 of the stator 12. For example, a housing may be shrink-fitted over an outer diameter of the stator 12 and may include end plates that are pulled together with bolts or other fasteners to hold the laminations 25 in place.
- Surface welding/bonding of the laminations 25 of the core 23 of the stator 12. For example, outside and/or inside diameters of the stator 12 may be welded to ensure integrity of the stacked laminations 25 of the stator 12. Additionally, an outside or inside diameter of the stator 12 may be bonded with a structural adhesive or molded-on polymer layer to ensure integrity of the stator 12 and seal the stator 12 against oil introductions.
- Insulation of the laminations 25 of the stator 12 with sealing/bonding properties. More particularly, the laminations 25 of the stator 12 may be electrically insulated from one another with a material such as varnish.

Figure 2:
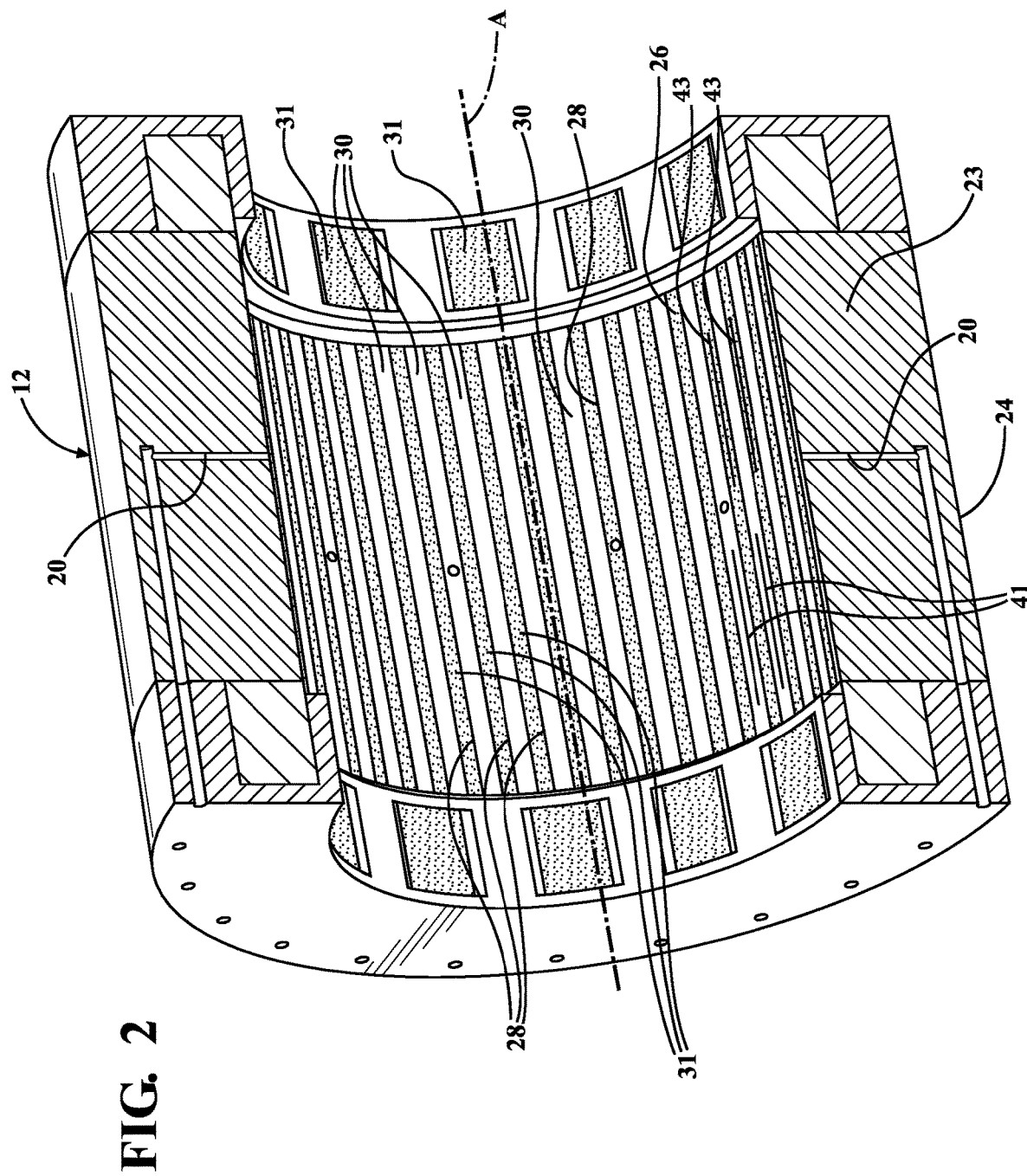
FIG. 2 is a perspective, cutaway view of the stator of the lubricant supported electric motor illustrating an inside diameter of the stator comprised of electrical conductors and teeth of the stator.

During assembly, after the stacked layers 38, 40, 42 of electrical conductors 31 are positioned inside the slots 28, the outer raceway 32 is optionally machined or finished to create a smooth finish of the outer raceway 32 that is suitable for the application of interest. The inner and outer raceways 36, 32 may include features to improve and maintain the film of lubricant 18 (e.g. close-tolerance areas, pocket areas, and others). This may include bearing structures such as are known for hybrid journal bearings. Moreover, the assembled structures of the stator 12 can also be used to create bearing surface features along the outer raceway 36, such as:

- Bearing hydrodynamic, close clearance regions (see, e.g., close clearance region 37 in FIG. 4.)
- Bearing hydrostatic pocket regions:
    - One or more of the electrical conductors 31 may be located slightly radially outwardly of the teeth 30 (i.e., the electrical conductors 31 may be slightly more shallow than the teeth 30).
    - Edges of the slots 28 may be formed by laminations or copper windings which extend radially inwardly to a greater extent than the teeth 30 of the stator 12. See, for example, the perimeter of copper laminations 39 shown in FIG. 4.
    - As shown in FIG. 2, drain gutters 41 may be formed along an inside diameter of the stator 12, and hydrodynamic pockets 43 may be formed along an inside diameter of the electrical conductors 31.
- Bearing hydrodynamic regions with compliance to offer close-clearance relief in high-rpm, high-dynamic-pressure conditions; and
- Bearing hydrodynamic regions with compliance to offer load sharing in shock loading and high acceleration conditions (create conditions conducive to squeeze film formations). More particularly, close-clearance bearing hydrodynamic areas where stiffness of the stator laminations and/or copper electrical conductors 31 may be reduced or be "compliant" so that in heavy shock load cases where the rotor weighs heavily on the stator 12, the stator 12 deforms a small amount to increase the area of rotor 10 and stator 12 that are in contact.

In view of the foregoing, the stacked layers 38, 40, 42 of electrical conductors 31 arranged circumferentially between teeth 30 of the stator 12 are arranged in such a manner to:

Provide stiff, compressive mechanical support to compensate for loads applied to the outer raceway 26.

Provide electrical insulation circumferentially between the electrical conductors 31 via the teeth 30.

Provide thermal conduction to the core 23 of the stator 12 for cooling purposes.

Provide mechanical support for the electrical conductors 31 in the event that they are subjected to magnetic forces and mechanical vibrations.

Provide in-slot 28 cooling passages 43 as needed (e.g., as shown in FIG. 4).

Provide mechanical support for the core 23 of the stator 12 and electrical conductors 31 under conditions of different thermal expansion of the laminations of the core 23 and electrical conductor 31 structures. For example, the tapered shape of the slots 28 compresses the electrical conductors 31 downwards toward the radially outside surface 24 of the core 23, which maintains a diameter of the outer raceway 32.

Provide for different materials in lower layers 40, 42 of electrical conductors 31 which are primarily used to provide conduction versus the top layer 38 of electrical conductors 31, which is primarily used as part of the inner raceway 36.

The structure of the stator 12 can also incorporate features to support other aspects of motor operation, such as:

Bearing lubricant supply passages 20.

Bearing lubricant supply passages 20 with capillary or orifice regions to restrict lubricant flow.

Cooling with oil routed through the stator 12 to the bearing area through the supply passages 20.

Rotor 14/stator 12 proximity sensing with capacitance bridge measurements.

Rotor 14/stator 12 proximity sensing with variable reluctance or hall-effect magnetic sensing.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. An electric motor comprising:
an annular stator extending about an axis and presenting a first stator radial surface and a second stator radial surface disposed opposite the first stator radial surface;
a rotor extending about the axis and rotatable relative to the stator and presenting a rotor radial surface defining a rotor raceway disposed in spaced relationship with the first stator radial surface to define a gap therebetween for containing a lubricant;
the rotor coupled with a drive assembly for coupling the electric motor to a wheel of a vehicle;
the first stator radial surface defining a plurality of slots in spaced relationship with one another and each being tapered from adjacent the second stator radial surface to the first stator radial surface to define a plurality of spaced teeth each disposed between adjacent ones of the plurality of slots and collectively presenting the first stator radial surface;
at least one axially extending conductor disposed in each of the plurality of slots and configured to selectively create a moving magnetic field for acting upon the rotor for providing rotational movement of the rotor in response to a current being applied to the at least one axially extending conductor in each of the plurality of slots; and
a portion of the at least one axially extending conductor in each of the plurality of slots extending substantially into radial alignment with the first stator radial surface of the stator and lacking a polymer coating or bearing sleeve disposed in overlaying relationship with the portion of the at least one axially extending conductor and the radially aligned first stator radial surface_to define a stator raceway of the stator by circumferentially alternating segments of the at least one axially extending conductive bar disposed in each of the plurality of slots and the first stator radial surface presented by the plurality of spaced teeth.

2. The electric motor as set forth in claim 1, wherein the at least one axially extending conductor in each of the plurality of slots includes a plurality of axially extending conductors in each of the plurality of slots.

3. The electric motor as set forth in claim 2, wherein the plurality of axially extending conductors in each of the plurality of slots are fitted in the respective slot using at least one of an interference press fit, thermal shrink fit, and a displacement/deformation rolling process in order to provide a tight fit of the plurality of axially extending conductors in the slot.

4. The electric motor as set forth in claim 2, wherein the plurality of axially extending conductors in each of the plurality of slots includes at least a first layer of axially extending conductors radially stacked over a second layer of axially extending conductors, and wherein the first layer of axially extending conductors is made of a harder and less conductive material than the second layer of axially extending conductors.

5. The electric motor as set forth in claim 4, wherein each of the first and second layers of the axially extending conductors in each of the plurality of slots defines a respective substantially planar surface, and wherein the respective substantially planar surfaces of the first and second layers of axially extending conductors overly and engage one another in the plurality of slots in order to provide mechanical stiffness and to minimize insulation between the first and second layers of axially extending conductors.

6. The electric motor as set forth in claim 1, wherein the stator raceway presents a substantially smooth surface in the circumferential direction.

7. The electric motor as set forth in claim 1, wherein the stator defines at least one passageway in fluid communication with the gap for passing a lubricant into the gap.

* * * * *